(12) United States Patent
Liu et al.

(10) Patent No.: US 8,954,805 B2
(45) Date of Patent: Feb. 10, 2015

(54) COMPUTER BOOTING METHOD AND COMPUTER SYSTEM

(75) Inventors: Chih-Chien Liu, Taipei (TW); Feng-Hsun Chen, Taipei (TW); Chia-Tsung Cheng, Taipei (TW)

(73) Assignee: Compal Electronics, Inc., Taipei (TW)

( * ) Notice: Subject to any disclaimer, the term of this patent is extended or adjusted under 35 U.S.C. 154(b) by 351 days.

(21) Appl. No.: 13/450,481

(22) Filed: Apr. 19, 2012

(65) Prior Publication Data

US 2012/0272095 A1 Oct. 25, 2012

Related U.S. Application Data

(60) Provisional application No. 61/477,159, filed on Apr. 19, 2011.

(51) Int. Cl.
| | | |
|---|---|---|
| G06F 11/00 | (2006.01) | |
| G06F 9/44 | (2006.01) | |
| G06F 9/445 | (2006.01) | |
| G06F 11/22 | (2006.01) | |
| G06F 11/07 | (2006.01) | |
| G06F 11/14 | (2006.01) | |

(52) U.S. Cl.
CPC .............. *G06F 9/4401* (2013.01); *G06F 8/665* (2013.01); *G06F 11/2284* (2013.01); *G06F 11/0748* (2013.01); *G06F 11/0793* (2013.01); *G06F 11/1417* (2013.01)
USPC .................. 714/36; 714/4.11; 714/42; 713/1; 713/2

(58) Field of Classification Search
CPC ............ G06F 11/1417; G06F 11/1438; G06F 11/1441; G06F 11/1458; G06F 11/1469; G06F 11/22; G06F 11/2284
USPC .......... 714/4.11, 6.12, 6.3, 15, 20, 30, 36, 42; 713/1, 2
See application file for complete search history.

(56) References Cited

U.S. PATENT DOCUMENTS

| | | | |
|---|---|---|---|
| 7,318,173 B1* | 1/2008 | Falik et al. | 714/36 |
| 8,161,322 B2* | 4/2012 | Gough | 714/15 |
| 2002/0147941 A1* | 10/2002 | Gentile | 714/36 |
| 2004/0153724 A1* | 8/2004 | Nicholson et al. | 714/6 |
| 2008/0184023 A1* | 7/2008 | Shih | 713/2 |
| 2009/0307481 A1* | 12/2009 | Wisecup et al. | 713/2 |

* cited by examiner

*Primary Examiner* — Joseph D Manoskey
(74) *Attorney, Agent, or Firm* — Jianq Chyun IP Office

(57) ABSTRACT

A computer booting method is provided for a computer system. The method comprises performing a power-on-self test. When the test result shows no error on the BIOS, a booting procedure is executed. When the test result shows the BIOS is damaged, whether the computer system stores a backup file of the BIOS is determined. When the computer system stores the backup file, the central processing unit reads the data of backup file and write it into a BIOS system memory and a reboot process is performed. When there is no backup file in the computer system, the computer system is connected to an internet server and downloads a BIOS backup file to the system main memory from the internet server. The central processing unit reads the BIOS backup file and write it into the BIOS system memory and a reboot process is formed.

14 Claims, 4 Drawing Sheets

COMPUTER BOOTING METHOD AND COMPUTER SYSTEM

CROSS-REFERENCE TO RELATED APPLICATION

This application claims the priority benefit of U.S. provisional application Ser. No. 61/477,159, filed Apr. 19, 2011. The entirety of the above-mentioned patent application is hereby incorporated by reference herein and made a part of this specification.

BACKGROUND OF THE INVENTION

1. Field of Invention

The present invention relates to a computer booting method and a computer system. More particularly, the present invention relates to a booting method and a computer system capable of directly analyzing a file partition format of a storage device to read a stored backup file of a basic input/output system (BIOS) or directly downloading a suitable backup file of the BIOS from the internet server when errors happen in a basic input/output system (BIOS).

2. Description of Related Art

Generally speaking, the first action to be executed while booting the computer system is initiate a basic input/output system (BIOS). When the BIOS is executed, a power-on self test (POST) is first performed to make sure the hardware equipments of the computer system can be normally operated. When the POST is finished, the BIOS tries to read the first sector of the hard disk which is so-called master boot record (MBR). The data in the MBR are loaded into a memory at location 0000:7C00 to be executed. Then data of a boot sector provided by an operating system (OS) is loaded to enter the OS.

Currently, because of the reasons including the computer system needs to support the new hardware or errors happen on the program code of the BIOS, the user need to frequently update the BIOS stored in the flash memory on the main board. However, in the updating process, the BIOS of the computer system is damaged due to unexpected power interruption or computer reset. If the damaged portion of the BIOS is within the main program sector and the boot sector still remain as a whole, the user cannot update the BIOS by using the external devices of the computer system. Thus, the user needs to deliver the computer system back to the original manufacturer to update the BIOS.

SUMMARY OF THE INVENTION

The present invention is to provide a computer booting method capable of downloading a backup file of a suitable basic input/output system (BIOS) from an internet server when the BIOS is damaged.

The present invention is to provide a computer system capable of directly analyzing a file partition format of a storage device for reading a stored backup file of a BIOS when the BIOS is damaged.

The invention provides a computer booting method for a computer system having a storage device, a BIOS system memory, a central processing unit, a system main memory and an internet hardware module. The computer booting method comprises steps of receiving a booting signal and, according to the booting signal, performing a power-on self test (POST). When the POST shows no error happens in a BIOS of the computer system, a booting procedure of the computer system is performed. When the POST shows the BIOS is damaged, the storage device is check to find out whether a backup file of the BIOS is stored in the storage device. When the storage device stores the backup file, the central processing unit reads the backup file, writes the backup file into the BIOS system memory and then performs a reboot process. When the storage device does not store the backup file, the computer system connects to an internet server through an internet and downloads the backup file of the BIOS corresponding to the computer system into the system main memory and the central processing unit of the computer system reads the backup file and writes the backup file into the BIOS system memory and then performs the reboot process.

According to one embodiment of the present invention, the BIOS comprises a file management module and after the step of the POST showing the BIOS is damaged and before the step of checking whether the storage device of the computer system stores the backup file of the BIOS, the computer booting method further comprises: the file management module analyzing a file partition format of the storage device for storing the backup file.

According to one embodiment of the present invention, the BIOS comprises a read-write module and the step of the central processing unit of the computer system reading the backup file and writing the backup file into the BIOS system memory further comprises: the central processing unit executing a content of a built-in program of the read-write module of the BIOS and, according to the content of the built-in program, reading the backup file and writing the backup file into the BIOS system memory.

According to one embodiment of the present invention, a stored file partition format of the backup file includes a global unique identifier (GUID) partition table (GPT) format, a new technology file system (NTFS) format, a file allocation table (FAT) format or an FAT32 format.

According to one embodiment of the present invention, the BIOS further comprises an internet module and after the computer system connects to the internet server through the internet and before the backup file of the BIOS is downloaded from the internet server and is written into the BIOS system memory, the computer booting method further comprises issuing a download request to the internet server through the internet. According to the download request, the backup file of the BIOS is downloaded into the system main memory and the central processing unit of the computer system, according to the content of the built-in program of the read-write module, reads the backup file of the BIOS and writes the BIOS into the BIOS system memory.

The invention further provides a computer system including a storage device, a BIOS system memory, a central processing unit, a system main memory and an internet hardware module. The BIOS system memory stores a BIOS, wherein the BIOS comprises a detection module, a file management module, an internet module and a read-write module. The detection module performs a POST while the computer system receives a booting signal. When the POST shows the BIOS is damaged, the file management module checks whether a backup file of the BIOS is stored in the storage device of the computer system. When the storage device does not store the backup file, the internet module connects to an internet server and downloads the BIOS corresponding to the computer system from the internet server. When the storage device stores the backup file, the read-write module writes the backup file into the BIOS system memory and when the storage device does not store the backup file, the read-write module writes the backup file of the BIOS downloaded by the internet module into the BIOS system memory.

According to one embodiment of the present invention, the file management module directly analyzes a file partition format of the storage device of the computer system.

According to one embodiment of the present invention, a file partition format of the storage device includes a global unique identifier (GUID) partition table (GPT) format, a new technology file system (NTFS) format, a file allocation table (FAT) format or an FAT32 format.

According to one embodiment of the present invention, the internet module comprises a local area network module, a wireless local area network (WLAN) module, third generation telecommunication technology (3G) internet module or a long term evolution (LTE) high speed network.

According to one embodiment of the present invention, the BIOS system memory includes a flash memory.

According to one embodiment of the present invention, according to the booting signal, the central processing unit loads the BIOS into the system main memory to perform a booting procedure.

Accordingly, when the POST shows that the BIOS is damaged, the backup file can be directly read from the storage device of the computer system due to that the BIOS of the present invention comprises a file management module which can directly analyze the file partition formats of different storage devices and the read-write module of the BIOS writes the backup file into the BIOS system memory to solve the problem that the original BIOS is damaged or errors happen on the original BIOS. Moreover, since the BIOS of the present invention comprises an internet module which can be enabled in advanced under the circumstance that the booting procedure is not yet accomplished and the POST shows the BIOS is damaged in order to download the BIOS corresponding to the computer system from the internet server, the problem of damaged BIOS discovered by the POST can be solved. Therefore, the computer booting method and the computer system provided by the present invention provide the user a convenient and fast computer booting method and improve the usage convenience for the user.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
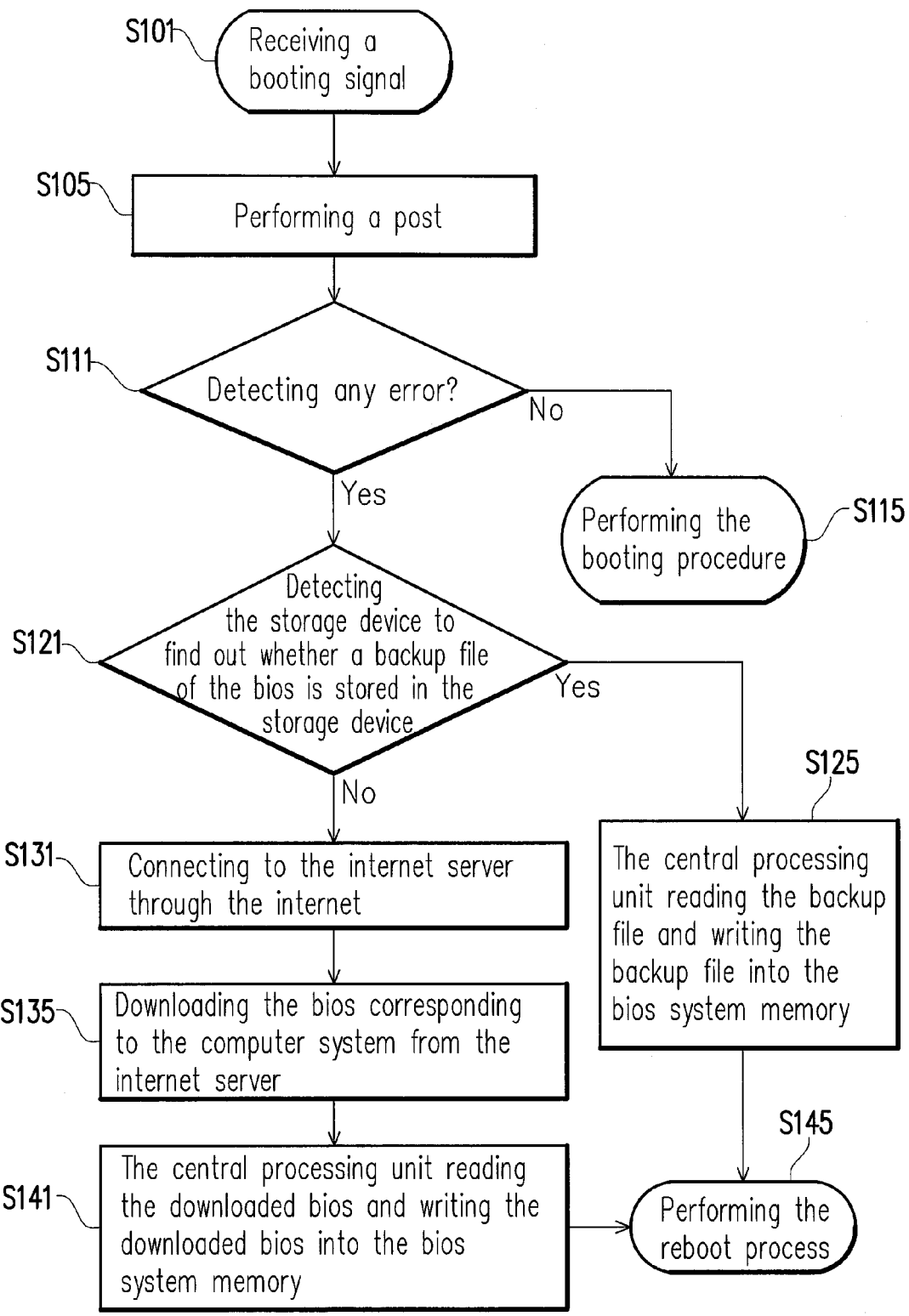
FIG. 1 is a flow chart schematically illustrating a booting method according to one embodiment of the invention.
Figure 2:
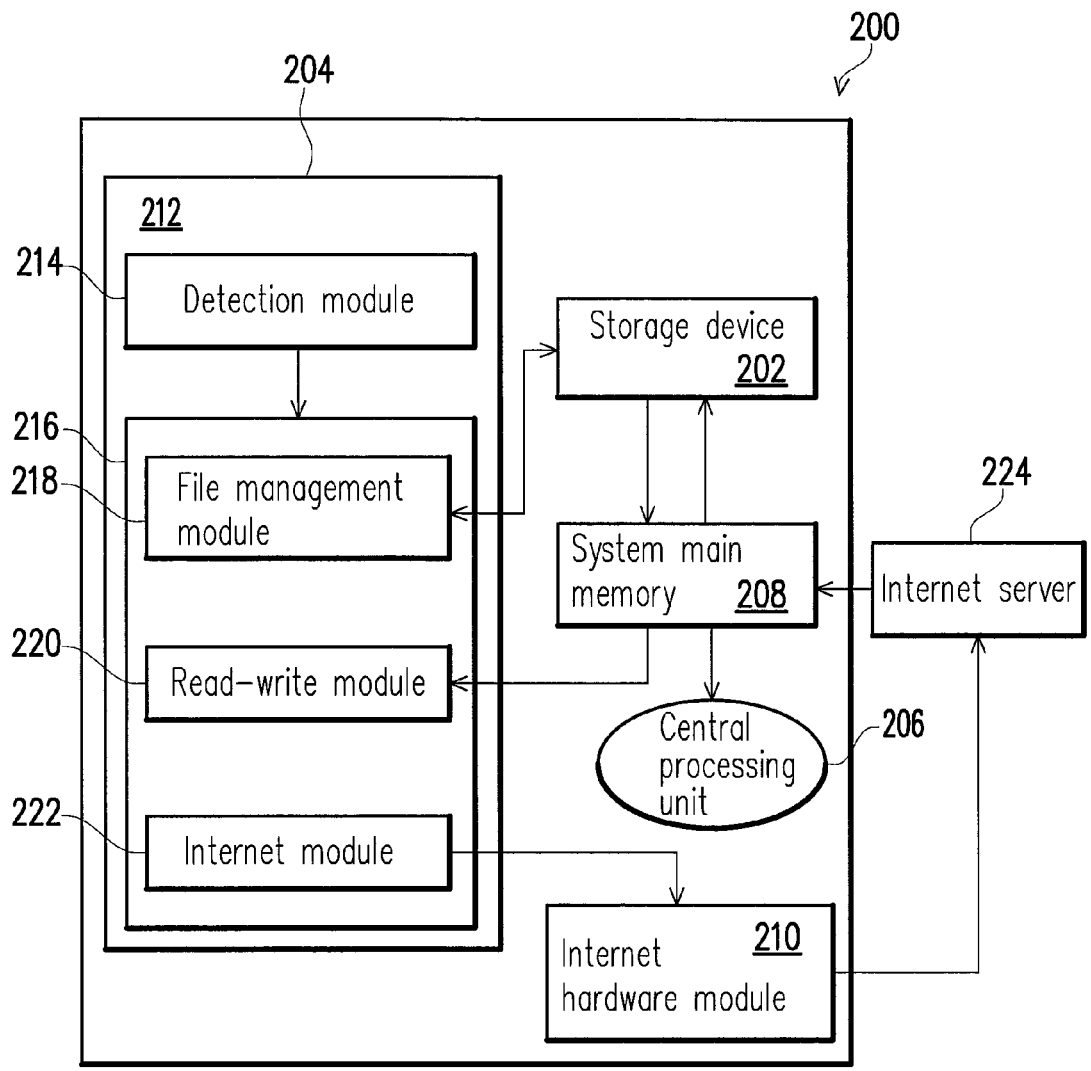
FIG. 2 is schematic diagram showing a computer system according to one embodiment of the invention.

FIG. 1 is a flow chart schematically illustrating a booting method according to one embodiment of the invention. FIG. 2 is schematic diagram showing a computer system according to one embodiment of the invention. As shown in FIG. 1 and FIG. 2, the booting method of the present embodiment is suitable for a computer system 200 comprising a storage device 202, a basic input/output system (BIOS) system memory 204, a central processing unit 206, system main memory 208 and an internet hardware module 210. The BIOS system memory 204 stores a BIOS 212 and the BIOS system memory 204 comprises a non-volatile memory, such as a flash memory. This BIOS at least comprises a detection module 214 and a pre-extensible firmware interface initialization (PEI) module 216. This PEI module 216 comprises a file management module 218, a read-write module 220 and an internet module 222. The aforementioned read-write module 220 can be, for example, a flash memory. The internet module 222 can be, for example, a local area network (LAN) module, a wireless local area network (WLAN) module, third generation telecommunication technology (3G) internet module or a long term evolution (LTE) high speed network.

In the step S101, a booting signal is received and, according to the booting signal, the central processing unit 206 of the computer system loads the BIOS 212 stored in the BIOS system memory 204 of the computer system 200 into the system main memory 208. In the step S105, the detection module 214 performs a power-on self test (POST) to detect hardware elements of the computer system 200, such as the keyboard, the disc device or the input/output port, to be normally operated or correctly initialized or to detect whether the BIOS is damaged (step S111).

When the POST shows the BIOS of the computer system is fine without being damaged, a booting process of the computer system 200 is performed (step S115). Alternatively, when the POST shows the BIOS of the computer system is damaged which leads to computer booting failure, it is checked whether a backup file of the BIOS is stored in the storage device 202 of the computer system 200 (step S121). In one embodiment, whether the storage device 202 of the computer system 200 stores the backup file of the BIOS is determined by executing the file management module 218 of the PEI module 216 of the BIOS and the backup file of the BIOS can be, for example, a basic input/output system read-only file. Moreover, the stored file partition format of the backup file can be, for example, the global unique identifier (GUID) partition table (GPT) format, the new technology file system (NTFS) format, the file allocation table (FAT) format or the FAT32 format.

When the storage device 202 stores the backup file of the BIOS 212, the backup file is loaded into the system main memory 208 and is written into the BIOS system memory 204 from the system main memory 208 by the central processing unit 206 executing the program content of the read-write module 220 of the BIOS 212 (step S125). Then, the central processing unit 206 performs a booting process (step S145). The file management module 218 can directly check whether the version of the backup file in the storage device 202 is the latest version or the backup file exists in the storage device 202. If not, the backup file is updated or written into the storage device 202 before the booting process is performed. More specifically, in the present invention, after the POST shows there is error in the BIOS of the computer system (step S111) and before it is checked whether a backup file of the BIOS is stored in the storage device of the computer system (step S121), the file management module 218 in the BIOS 212 can analyze the backup file with the file partition format which is the GPT format, the NTFS format, the FAT format or the FAT32 format in the storage device. Since, in the present invention, the BIOS comprises file management module can directly analyze the program with the file partition format which is NTFS format in the storage device (that is, the file management module can perform more complicated operations on the BIOS with the NTFS format), the file management module 218 directly check whether a backup file exists in the storage device 202 and when the backup file does exist in the storage device 202, the central processing unit 206 executes the program content (built-in program content) of the read-write module 220 of the BIOS and, based on the program content, directly reads the backup file stored in the storage device 202 and writes the backup file into the BIOS system memory 204 through the system main memory 208.

Figure 1A:
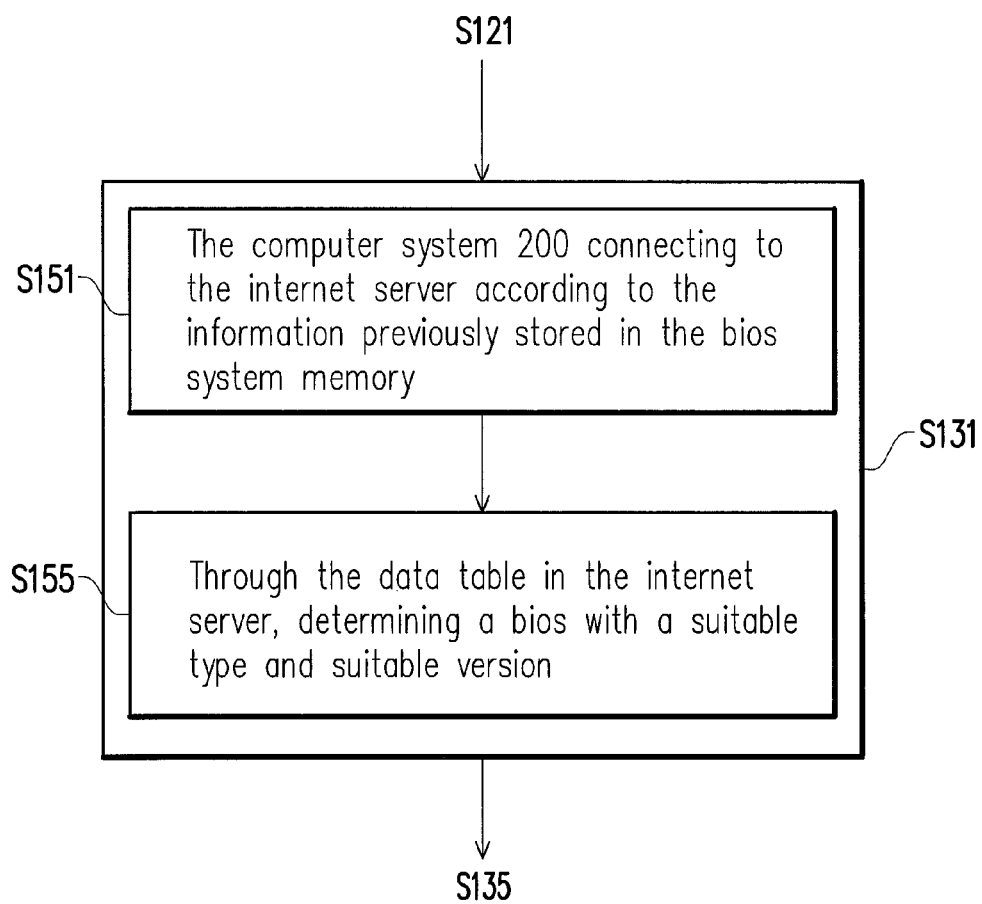
FIG. 1A is a flow chart schematically illustrating a method for connecting to an internet server through the internet when a storage device does not store a backup file according to one embodiment of the invention.

In addition, when the storage device 202 does not store the backup file, in the step S131 and under the circumstance that the booting process is not accomplished, the internet module 222 of the BIOS 212 is enabled to connect to an internet server 224 (such as an internet cloud server) through an internet (not shown). The internet cloud server can be, for example, a personal cloud server, including a hand-held electronic device. In one embodiment, in the aforementioned method for connecting to the internet server through the internet, the information of the type and the version of the BIOS 212 of the computer system 200 has been recorded in the BIOS system memory 204 already before the computer system 200 leaves the factory. The information recorded in the BIOS system memory 204 further comprises a unique identifier (such as signature, project ID, Version, GUID and etc.) and the version of the BIOS. FIG. 1A is a flow chart schematically illustrating a method for connecting to an internet server through the internet when a storage device does not store a backup file according to one embodiment of the invention. As shown in FIG. 1A, when the computer system 200 does not store the backup file, in the step S151, the computer system 200 can connect to an internet server according to the information (including the hyperlinks) previously stored in the BIOS system memory 204. The internet server can be, for example, a system service provider, a main board manufacturer or a cloud server. Furthermore, the cloud server can be, for example, a personal cloud server including a hand-held electronic device. In another embodiment, the internet server can be, for example, a user-defined server including a personal computer or a hand-held electronic device (such as a mobile phone). Moreover, in the other embodiment, a data table is built in the internet server 224 in advance for recording the identifying methods or identification numbers respectively corresponding to the type and the version of the BIOS. Thus, when the computer system 200 connects to the internet server, a suitable type and version of the BIOS can be determined through the data table (step S155). Accordingly, the backup file of the BIOS corresponding to the computer system 200 can be downloaded into the system main memory 208 and the central processing unit, based on the program content of the read-write module 220 (see the following steps S135 and S141), updates the downloaded BIOS to perform the reboot process (see following step S145).

Figure 1B:
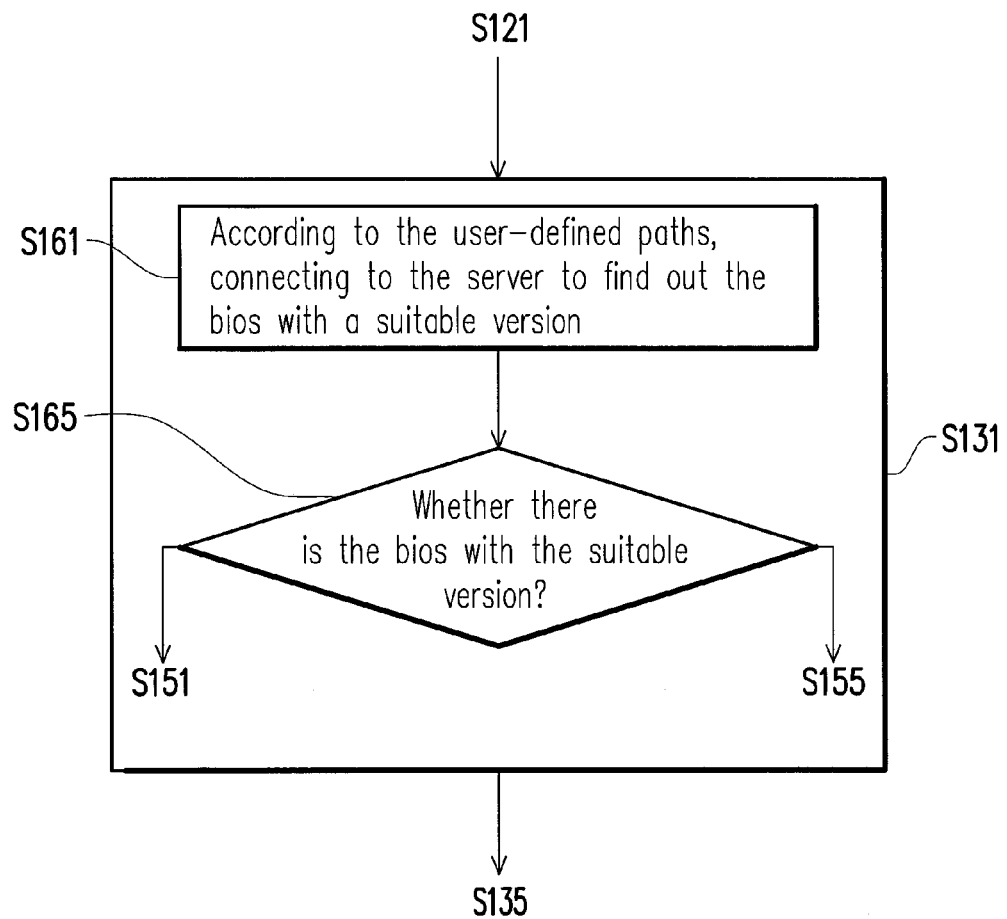
FIG. 1B is a flow chart schematically illustrating a method for connecting to an internet server through the internet when a storage device does not store a backup file according to another embodiment of the invention.

Furthermore, in one embodiment, the user can self download the BIOS into a server (such as an internet server or a user-defined server, including a personal computer). Hence, when the computer system 200 does not store the backup file, the computer system 200 can connect to the server storing the pre-downloaded BIOS, find out the BIOS with a suitable version in the server and download the backup file of the BIOS so as to perform the reboot process. For instance, the user sets a set of user-defined paths in the system setting menu of the BIOS or utilizes the application to set a set of user-defined paths in the windows system (i.e. the user-defined paths are the addresses of the servers storing the pre-downloaded BIOSs). Moreover, after the application communicates with the BIOS, the BIOS records the set of the user-defined paths (addresses) in the BIOS system memory. FIG. 1B is a flow chart schematically illustrating a method for connecting to an internet server through the internet when a storage device does not store a backup file according to another embodiment of the invention. As shown in FIG. 1B, when the BIOS of the computer system is damaged which leads to failure in booting the computer system, the computer system connects to the server (such as the personal computer), according to the information (including the paths (addresses) of the servers) stored in the BIOS system memory, to find out the BIOS with the suitable version (steps S161 and S165). When there is the BIOS with the suitable version in the server, the backup file of the BIOS corresponding the computer system 200 is downloaded into the system main memory 208 and the central processing unit updates the downloaded BIOS, according to the program content of the read-write module 220 (see the following steps S135 and S141), to perform the reboot process (see the following step S145). Alternatively, when there is no BIOS with the suitable version in the server, the information previously recorded in the BIOS system memory before the computer system leaves the factory is utilized to find the BIOS with the suitable version from the internet server in the internet (i.e. the steps S151 and S155 described in the aforementioned embodiment).

In the step S135, the BIOS corresponding to the computer system 200 is downloaded from the internet server 224 and the central processing unit executes the program content of the read-write module 220 of the BIOS to write the downloaded BIOS into the BIOS system memory 204 through the system main memory 208 (the step S141). Then, the reboot process is performed and the central processing unit 206 executes the downloaded backup file of the BIOS (step S145). In another embodiment, after the computer system connects to the internet server 224 through the internet (the step S131) and before the BIOS is downloaded from the internet server 224 (the step S135), it further comprises steps of issuing a download request to the internet server 224 through the internet module 222 and then, according to the download request, downloading the backup file of the BIOS into the system main memory 208. Noticeably, the BIOS 212 of the present invention comprises an internet module 222. Thus, under the circumstance that the booting process is not accomplished and when the POST shows the BIOS 212 is damaged, the internet module 222 of the BIOS 212 is directly enabled to connect to the internet server 224 through an internet to download the backup file of the BIOS suitable for the present computer system so as to benefit the later performed reboot process.

Altogether, in the present invention, the BIOS comprises a file management module which can directly analyze the file partition format of the storage device so as to read the stored backup file of the BIOS which is the program with complex file format such as NTFS format. Therefore, when the POST shows that the BIOS is damaged, the backup file in the storage device of the computer system can be directly read and the central processing unit, according to the content of the built-in program of the read-write module, writes the backup file into the BIOS system memory.

In addition, since the BIOS of the present invention comprises an internet module which can be enabled in advanced under the circumstance that the booting procedure is not yet accomplished in order to download the backup file of the BIOS corresponding to the computer system from the internet server, the problem of damaged BIOS discovered by the POST can be solved. Comparing with the conventional technique in which the hardwares (such as the disk player, the hard disk, the floppy disk or the USB flash drive) other than the computer system itself storing the backup file for the booting procedure are utilized when the BIOS is damaged or malfunction, the computer booting method and the computer system provided by the present invention provide the user a convenient and fast computer booting method and improve the usage convenience for the user.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A computer booting method for a computer system, comprising:
   receiving a booting signal;
   according to the booting signal, performing a power-on self test (POST);
   when the POST shows no error happens in a basic input/output system (BIOS) of the computer system, performing a booting procedure;
   when the POST shows the BIOS is damaged:
      checking whether a backup file of the BIOS is stored in a storage device in the computer system;
      when the storage device stores the backup file, a central processing unit of the computer system reading the backup file, writing the backup file into a BIOS system memory of the computer system and performing a reboot process; and
      when the storage device does not store the backup file, connecting to an internet server through an internet, downloading the backup file of the BIOS corresponding to the computer system into a system main memory of the computer system, and the central processing unit of the computer system reading the downloaded backup file of the BIOS and writing the downloaded backup file of the BIOS into the BIOS system memory and then performing the reboot process.

2. The computer booting method of claim 1, wherein the BIOS comprises a file management module and after the step of the POST showing the BIOS is damaged and before the step of checking whether the storage device of the computer system stores the backup file of the BIOS, the computer booting method further comprises:
   the file management module analyzing a file partition format of the storage device to read the backup file stored in the storage device.

3. The computer booting method of claim 1, wherein the BIOS comprises a read-write module and the step of the central processing unit of the computer system reading the backup file and writing the backup file into the BIOS system memory further comprises:
   the central processing unit executing a content of a built-in program of the read-write module of the BIOS and, according to the content of the built-in program, reading the backup file and writing the backup file into the BIOS system memory.

4. The computer booting method of claim 1, wherein a stored file partition format of the backup file includes a global unique identifier (GUID) partition table (GPT) format, a new technology file system (NTFS) format, a file allocation table (FAT) format or an FAT32 format.

5. The computer booting method of claim 1, wherein the BIOS is stored in the BIOS system memory and the BIOS system memory stores information of the BIOS including a unique identifier, a version of the BIOS or an address of the internet server and the BIOS further comprises an internet module and the step of connecting the internet server through the internet comprises:
   according to the information, connecting to the internet server; and
   according to the information, finding the backup file of the BIOS corresponding to the computer system in the internet server.

6. The computer booting method of claim 1, wherein the internet server includes a system service provider, a main board manufacturer, a cloud server, a personal cloud server, a user-defined server, a hand-held electronic device or a personal computer.

7. A computer system, comprising:
   a storage device;
   a basic-input/output-system (BIOS) system memory storing a BIOS, wherein the BIOS comprises:
      a detection module performing a power-on self test (POST) when the computer system receives a booting signal;
      a file management module, wherein when the POST shows the BIOS is damaged, the file management module checks whether a backup file of the BIOS is stored in the storage device of the computer system;
      an internet module, wherein when the storage device does not store the backup file, the internet module connects to an internet server and downloads the backup file of the BIOS corresponding to the computer system from the internet server; and
      a read-write module, wherein when the storage device stores the backup file, the read-write module writes the backup file into the BIOS system memory and when the storage device does not store the backup file, the read-write module writes the backup file of the BIOS downloaded by the internet module into the BIOS system memory.

8. The computer system of claim 7, wherein the file management module directly analyzes a file partition format of the storage device in order to read the backup file in the storage device.

9. The computer system of claim 7, wherein a file partition format of the storage device includes a global unique identifier (GUID) partition table (GPT) format, a new technology file system (NTFS) format, a file allocation table (FAT) format or an FAT32 format.

10. The computer system of claim 7, wherein the internet module comprises a local area network module, a wireless local area network (WLAN) module, third generation telecommunication technology (3G) internet module or a long term evolution (LTE) high speed network.

11. The computer system of claim 7, wherein the BIOS system memory includes a flash memory.

12. The computer system of claim 7, further comprising:
    a system main memory; and
    a central processing unit loading the BIOS into the system main memory, according to the booting signal, to perform a booting procedure.

13. The computer system of claim 7, wherein the BIOS system memory stores information of the BIOS including a unique identifier, a version of the BIOS or an address of the internet server.

14. The computer system of claim 7, wherein the internet server includes a system service provider, a main board manufacturer, a cloud server, a personal cloud server, a user-defined server, a hand-held electronic device or a personal computer.

* * * * *